(12) United States Patent
Mizutani

(10) Patent No.: US 12,427,820 B2
(45) Date of Patent: Sep. 30, 2025

(54) ATTACHMENT STRUCTURE FOR UPPER ARM OF DOUBLE WISHBONE SHOCK ABSORBER

(71) Applicant: TOYOTA JIDOSHA KABUSHIKI KAISHA, Toyota (JP)

(72) Inventor: Koh Mizutani, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/947,352

(22) Filed: Nov. 14, 2024

(65) Prior Publication Data
US 2025/0249718 A1    Aug. 7, 2025

(30) Foreign Application Priority Data
Feb. 1, 2024   (JP) .................................. 2024-013848

(51) Int. Cl.
*B60G 3/26*     (2006.01)
*B60G 7/00*     (2006.01)

(52) U.S. Cl.
CPC ............... *B60G 3/26* (2013.01); *B60G 7/001* (2013.01); *B60G 2200/144* (2013.01); *B60G 2204/129* (2013.01)

(58) Field of Classification Search
CPC .... B60G 3/26; B60G 7/001; B60G 2200/144; B60G 2204/129; B60G 7/02; B60G 7/04; B60G 2204/4308; B60G 2204/143; B60G 2200/156; B60G 3/225; B60G 2206/124; B62D 21/02; B62D 21/11
See application file for complete search history.

(56) References Cited

U.S. PATENT DOCUMENTS

| | | | | |
|---|---|---|---|---|
| 3,807,693 A | * | 4/1974 | Castoe .................... | B25B 27/00 72/704 |
| 4,184,697 A | * | 1/1980 | Suzuki .................... | B60G 7/02 280/124.109 |
| 4,263,980 A | * | 4/1981 | Harlow, Jr. ............. | B62D 21/11 180/312 |
| 4,762,336 A | * | 8/1988 | Ogawa .................... | B60G 7/00 267/257 |
| 4,813,507 A | * | 3/1989 | Tanaka .................... | B60G 7/04 301/124.1 |
| 4,817,973 A | * | 4/1989 | Takeda .................... | B62D 21/11 280/124.144 |

(Continued)

FOREIGN PATENT DOCUMENTS

JP    2018-001985 A    1/2018

*Primary Examiner* — Timothy Wilhelm
(74) *Attorney, Agent, or Firm* — SoraIP, Inc.

(57) ABSTRACT

The double wishbone shock absorber includes an upper arm that is pivotally supported by a side member having a rectangular cylindrical shape at an inner end thereof, and a lower arm that is pivotally supported by the suspension member at an inner end thereof and is pivotally supported at a lower end of the suspension at an outer end thereof. In a region of the side member that pivotally supports the inner end of the upper arm, an opening extending from the outer side hanging wall portion of the side member to the bottom wall portion is provided. A reinforcing member that closes the opening is attached to the opening. The reinforcing member is provided with a rigid portion for increasing rigidity.

4 Claims, 3 Drawing Sheets

(56) References Cited

U.S. PATENT DOCUMENTS

| | | | | |
|---|---|---|---|---|
| 5,040,824 A * | 8/1991 | Suss | B60G 7/02 | 267/140.3 |
| 5,052,711 A * | 10/1991 | Pirkey | B62D 17/00 | 280/86.753 |
| 5,098,118 A * | 3/1992 | Hayashi | B60G 3/06 | 280/124.134 |
| 5,169,171 A * | 12/1992 | Ban | B60G 13/001 | 280/86.753 |
| 5,238,262 A * | 8/1993 | Nunes | B60G 9/003 | 280/681 |
| 5,301,977 A * | 4/1994 | Schlosser | B62D 17/00 | 280/86.757 |
| 5,374,075 A * | 12/1994 | Lee | B60G 3/06 | 280/5.521 |
| 5,775,719 A * | 7/1998 | Holden | B62D 17/00 | 280/86.75 |
| 6,161,853 A * | 12/2000 | Jung | B60G 7/02 | 280/124.179 |
| 6,349,953 B1 * | 2/2002 | Yoshihira | B60G 7/02 | 280/124.109 |
| 6,352,272 B1 * | 3/2002 | Lee | B60G 7/02 | 280/124.125 |
| 6,367,826 B1 * | 4/2002 | Klais | B60G 7/02 | 280/86.751 |
| 6,375,221 B1 * | 4/2002 | Kudou | B62D 21/11 | 280/124.1 |
| 6,409,189 B1 * | 6/2002 | Orimoto | B62D 17/00 | 280/86.754 |
| 6,481,079 B1 * | 11/2002 | Newhan | B60G 3/20 | 29/401.1 |
| 6,516,914 B1 * | 2/2003 | Andersen | B60K 7/0007 | 280/124.179 |
| 6,659,479 B1 * | 12/2003 | Raidel, II | B60G 7/02 | 280/124.16 |
| 6,851,687 B2 * | 2/2005 | Klais | B62D 17/00 | 280/86.754 |
| 7,083,176 B2 * | 8/2006 | Soles | B60G 7/02 | 280/86.751 |
| 7,156,404 B2 * | 1/2007 | Krieger | B60G 3/20 | 280/86.753 |
| 7,204,500 B2 * | 4/2007 | Hunt | B60G 11/465 | 267/260 |
| 7,210,692 B2 * | 5/2007 | Galazin | B60G 7/02 | 280/124.1 |
| 7,219,883 B2 * | 5/2007 | Huprikar | B60G 7/02 | 267/293 |
| 7,360,756 B2 * | 4/2008 | Urquidi | B60G 7/02 | 267/281 |
| 7,360,778 B2 * | 4/2008 | Smith | B60G 11/04 | 267/260 |
| 7,458,594 B2 * | 12/2008 | Kim | B60G 7/02 | 280/124.134 |
| 7,475,890 B1 * | 1/2009 | Kern | B60G 7/02 | 280/86.751 |
| 7,513,517 B2 * | 4/2009 | Barton | B60G 7/02 | 280/124.116 |
| 7,575,243 B2 * | 8/2009 | Takahashi | B62D 25/08 | 280/124.128 |
| 7,588,129 B2 * | 9/2009 | Cockrell | B60G 13/003 | 267/66 |
| 8,083,243 B2 * | 12/2011 | Hamada | B62D 21/11 | 280/124.1 |
| 8,226,091 B2 * | 7/2012 | Lee | B60G 7/006 | 280/5.522 |
| 8,302,973 B2 * | 11/2012 | Lee | B60G 7/006 | 280/5.522 |
| 8,523,207 B2 * | 9/2013 | Dodd | B60G 9/00 | 180/209 |
| 8,534,411 B2 * | 9/2013 | Hirai | B62D 25/082 | 180/300 |
| 8,540,261 B2 * | 9/2013 | Okamoto | B60G 7/02 | 280/124.109 |
| 9,186,944 B2 * | 11/2015 | Luttinen | B60G 7/001 | |
| 9,186,945 B2 * | 11/2015 | Luttinen | B60G 3/04 | |
| 9,315,222 B1 * | 4/2016 | Wetter | B60G 9/02 | |
| 9,327,568 B1 * | 5/2016 | Mashimo | B60G 7/02 | |
| 9,333,825 B2 * | 5/2016 | Stockard | B23P 11/00 | |
| 9,387,886 B2 * | 7/2016 | Hall | B60G 3/20 | |
| 9,463,679 B2 * | 10/2016 | Marinescu | B60B 29/002 | |
| 9,567,009 B2 * | 2/2017 | Asano | B60G 3/20 | |
| 9,855,975 B2 * | 1/2018 | Amemiya | B62D 21/00 | |
| 10,556,474 B2 * | 2/2020 | Andou | B60G 7/001 | |
| 10,661,624 B2 * | 5/2020 | Andou | B60G 3/20 | |
| 10,766,326 B2 * | 9/2020 | Hata | B62D 21/15 | |
| 10,894,457 B2 * | 1/2021 | Galazin | B60G 11/10 | |
| 11,198,344 B2 * | 12/2021 | Senoo | B60G 11/08 | |
| 11,407,270 B2 * | 8/2022 | Mater, Jr. | B60G 17/023 | |
| 11,560,030 B2 * | 1/2023 | Senoo | B60G 7/04 | |
| 11,618,292 B2 * | 4/2023 | Haeusler | B60G 7/008 | 267/246 |
| 11,628,700 B2 * | 4/2023 | Twu | B60K 5/12 | 280/124.109 |
| 11,633,996 B2 * | 4/2023 | Andou | B60G 7/04 | 280/124.128 |
| 11,633,997 B2 * | 4/2023 | Twu | B60G 7/001 | 280/124.1 |
| 11,794,814 B2 * | 10/2023 | Czajkowski | B62D 7/18 | |
| 2006/0151970 A1 * | 7/2006 | Kaminski | B60G 3/06 | 264/46.7 |
| 2013/0042464 A1 * | 2/2013 | Orcutt | B23P 6/00 | 29/525.11 |
| 2015/0083514 A1 * | 3/2015 | Asano | B62D 25/082 | 180/312 |
| 2016/0272027 A1 * | 9/2016 | Dilworth | B60G 9/003 | |
| 2018/0001723 A1 | 1/2018 | Andou et al. | | |
| 2020/0062060 A1 * | 2/2020 | Chevalier | B60G 7/001 | |
| 2021/0323608 A1 * | 10/2021 | Czajkowski | B60G 7/02 | |
| 2024/0059353 A1 * | 2/2024 | Czajkowski | B62D 21/11 | |

\* cited by examiner

ATTACHMENT STRUCTURE FOR UPPER ARM OF DOUBLE WISHBONE SHOCK ABSORBER

CROSS-REFERENCE TO RELATED APPLICATION

This application claims priority to Japanese Patent Application No. 2024-013848 filed on Feb. 1, 2024, incorporated herein by reference in its entirety.

BACKGROUND

1. Technical Field

The present disclosure relates to an attachment structure for an upper arm of a double wishbone shock absorber.

2. Description of Related Art

For example, in paragraphs 0058 to 0061 of Japanese Unexamined Patent Application Publication No. 2018-001985 (JP 2018-001985 A), it is described that "in a structure in which an upper arm 2 of a double wishbone shock absorber is attached to a front side frame 100, attachment recesses 100$b$ (100$bf$, 100$br$) are provided in part of the side surface of the side frame 100, attachment brackets 111 each having a U-shape in plan view are fixed to the attachment recesses 100$bf$, 100$br$, and the inner ends of the upper arm 2 are attached to the attachment brackets 111."

SUMMARY

In JP 2018-001985 A, the attachment recesses 100$b$ (100$bf$, 100$br$) are not closed in part of the side surface of the side frame 100. Therefore, the rigidity of the side frame 100 may decrease and the side frame 100 may be easily deformed in the front-rear direction of the vehicle in the event of a front collision.

In JP 2018-001985 A, there is no such technical idea that the vertical sectional height dimension of the side frame 100 is reduced.

Therefore, in the case of adopting, for example, such a design that the hood height is as small as possible in a vehicle including a double wishbone shock absorber, it is necessary to design the upper end of a front suspension to tilt inward. In the case of such a design, the suspension may interfere with the outer corner of a top wall of the side frame 100 in JP 2018-001985 A.

If the design is changed to dispose the side frame 100 at a lower position to avoid the interference, the ground clearance of the vehicle may be too low and a drive shaft may interfere with the inner corner of a bottom wall of the side frame 100 when the drive shaft is raised. For these reasons, it is difficult to adopt the design in which the hood height of the vehicle is reduced.

In view of such circumstances, it is an object of the present disclosure to provide an attachment structure for an upper arm of a double wishbone shock absorber in which deformation of a side member in the event of a front collision can be reduced or prevented and the vertical sectional height dimension of the side member can be reduced to the extent possible.

The present disclosure provides an attachment structure for an upper arm of a double wishbone shock absorber including the upper arm that is tiltably supported in a cantilever manner on a side member having a rectangular tube shape and including an inner end disposed along a vehicle front-rear direction on each side in a vehicle right-left direction, and a lower arm that is tiltably supported in a cantilever manner on a suspension member including an inner end disposed below the side member and that supports a lower end of a suspension. The side member has an opening extending from an outer vertical wall to a bottom wall of the side member in a region in which an inner end of the upper arm is supported. A reinforcing member that closes the opening is attached to the opening, and the reinforcing member includes a rigid portion that increases rigidity.

This configuration increases the rigidity of the region of the side member in which the inner end of the upper arm is supported. Therefore, it is possible to reduce or prevent the deformation of the side member in the event of a front collision, reduce the vertical sectional height dimension of the side member to the extent possible by lowering the height position of the top wall of the side member to the extent possible, and adapt to the design in which the height position of the hood of the vehicle is as low as possible.

In the attachment structure described above, the reinforcing member may be an L-shaped plate in side view to close an area from an outer part to a bottom part of the opening, on a vertical wall of the reinforcing member that closes the outer part of the opening, the inner end of the upper arm may be tiltably supported and the rigid portion may be provided, and a bottom wall of the reinforcing member that closes the bottom part of the opening may be laid in alignment with the bottom wall of the side member in a vehicle up-down direction, and a portion laid in alignment may be fastened.

With this configuration, the height position of the bottom wall of the side member need not be lowered even in the above case where the vertical sectional height dimension of the side member is reduced to the extent possible by lowering the height position of the top wall of the side member to the extent possible. Thus, it is possible to avoid the occurrence of a case where a drive shaft that moves up and down along with travel interferes with the bottom wall of the side member when the drive shaft is raised.

In the attachment structure described above, the rigid portion may be a ridge portion protruding outward on a lower end side of the vertical wall of the reinforcing member and having a shape elongated in the vehicle front-rear direction.

Since the shape of the rigid portion is specified in this configuration, it is clear that the rigidity of the side member in the vehicle front-rear direction is improved by the presence of the rigid portion.

In the attachment structure described above, the vertical wall of the reinforcing member may be laid in alignment with the outer vertical wall of the side member in the vehicle right-left direction, and a portion laid in alignment may be fastened.

In the attachment structure described above, the side member may have the rectangular tube shape defined by a combination of an outer side member and an inner side member, and the outer side member may have the opening.

According to the present disclosure, it is possible to provide the attachment structure for the upper arm of the double wishbone shock absorber in which the deformation of the side member in the event of a front collision can be reduced or prevented and the vertical sectional height dimension of the side member can be reduced to the extent possible.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, the best mode for carrying out the present disclosure will be described in detail below with reference to the accompanying drawings.

Figure 1:
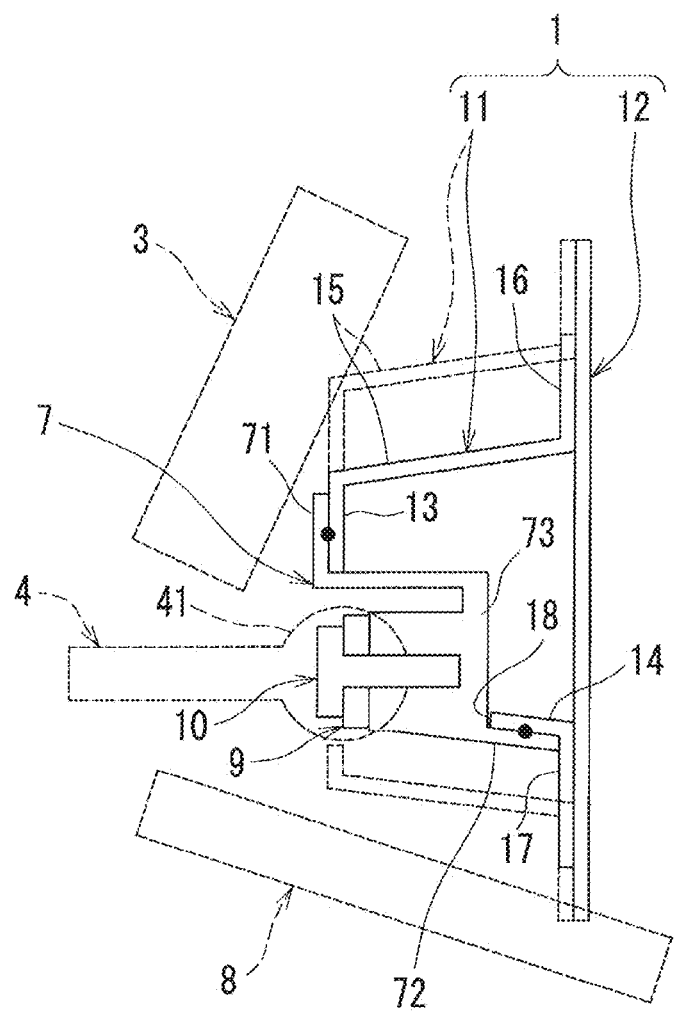
FIG. 1 is a side view schematically illustrating an embodiment of an attachment structure for an upper arm of a double wishbone shock absorber according to the present disclosure.
Figure 2:
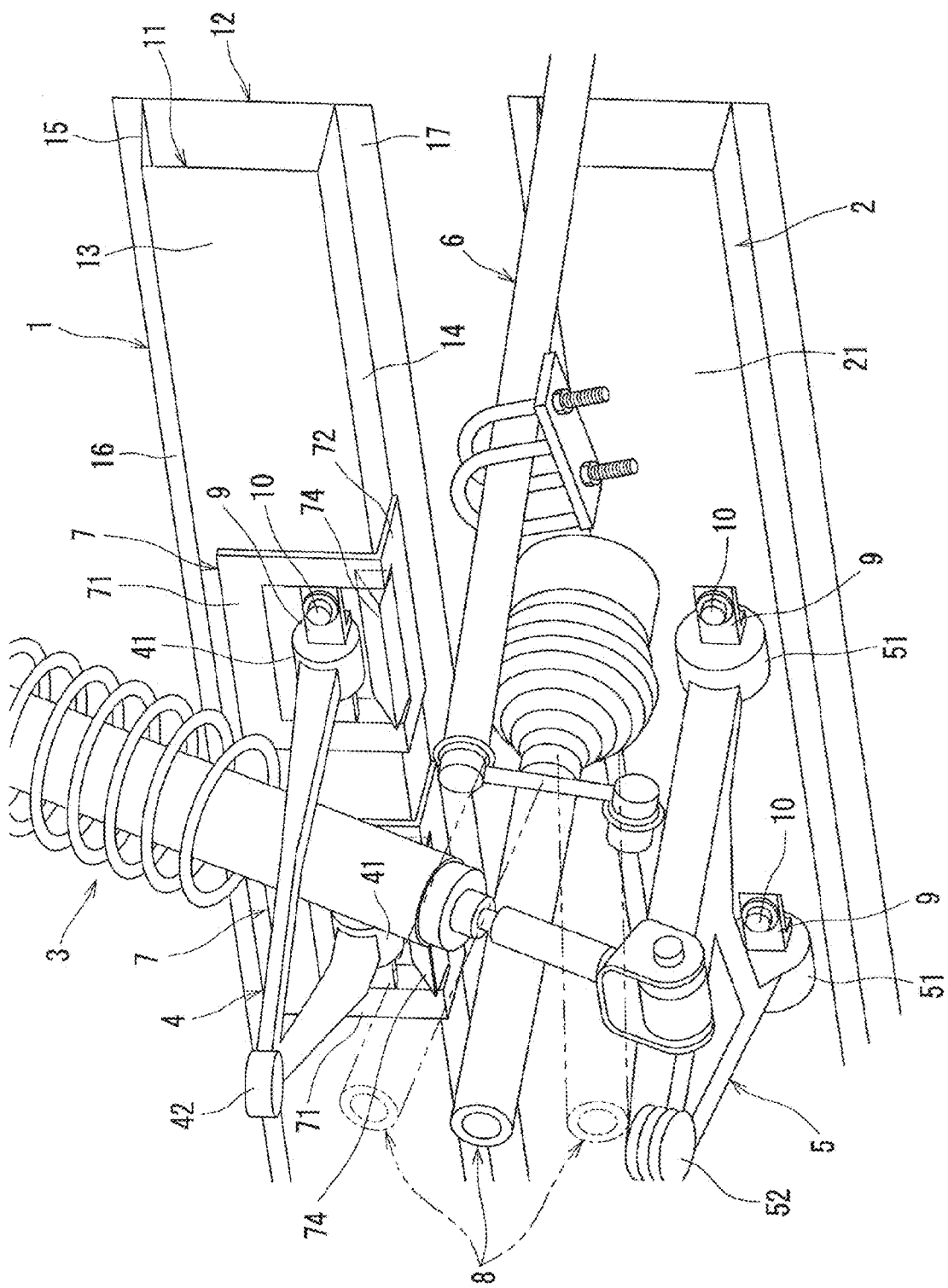
FIG. 2 is a perspective view showing a mounting configuration of an upper arm.
Figure 3:
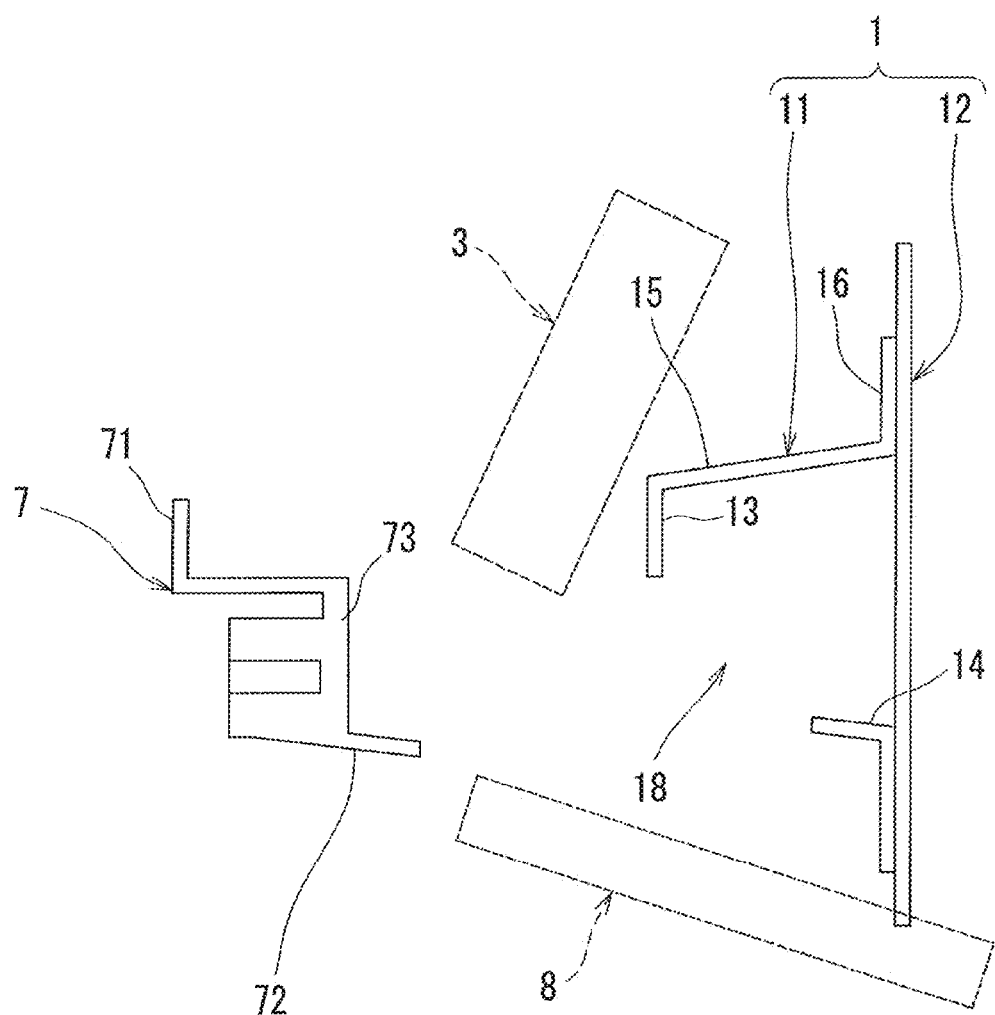
FIG. 3 is a side view schematically showing a state in which the reinforcing member is removed from the side member in FIG. 1.

FIG. 1 to FIG. 3 show an embodiment of the present disclosure. In this embodiment, a double wishbone shock absorber is shown in front of the right side of the vehicle. The double wishbone shock absorber in front of the left side of the vehicle is not shown, but is basically similar to the double wishbone shock absorber in front of the right side of the vehicle.

The double wishbone shock absorber shown in the figure is attached to the front side member 1 and the front suspension member 2, and includes a suspension 3, an upper arm 4, a lower arm 5, and the like.

The side member 1 is disposed along the vehicle front-rear direction while being spaced apart from the left side and the right side of the vehicle in parallel, and is formed in a rectangular cylindrical shape by combining the side member outer 11 and the side member inner 12.

The suspension member 2 is disposed below the side member 1 so as to be spaced apart from the left side and the right side of the vehicle along the vehicle front-rear direction.

The suspension 3 has a configuration in which a damper (not shown) and a coil spring (not shown) are combined, and an upper end thereof is attached to a suspension tower (not shown) by a bolt or the like. Although not shown, the lower end of the suspension 3 is pivotally supported in the middle of the lower arm 5 in the vehicle left-right direction.

The upper arm 4 is formed in a triangular shape gradually narrowing outward in the vehicle left-right direction from the side member 1 side in a plan view. The bifurcated inner end 41 of the upper arm 4 is pivotally supported on the side member 1 so as to be tiltable in a cantilever manner, and an upper end portion of a hub knuckle (not shown) is attached to the outer end 42 of the upper arm 4.

The lower arm 5 is formed in a triangular shape gradually narrowing outward in the vehicle left-right direction from the side member 1 side in a plan view. The bifurcated inner end 51 of the lower arm 5 is pivotally supported in a cantilever manner on the hanging wall portion 21 of the suspension member 2, and a lower end portion of a hub knuckle (not shown) is attached to the outer end 52 of the lower arm 5.

Although not shown, the hub knuckle rotatably supports the front disc brake and the front wheel, and is supported by the outer end 52 of the lower arm 5 and the outer end 42 of the upper arm 4.

Although not shown, a power steering device is attached to the hub knuckle via a tie rod, and one end (a right end in the drawing) of the stabilizer 6 is attached thereto.

In this embodiment, as shown in FIGS. 2 and 3, the opening 18 is provided at two places in the vehicle front-rear direction of the side member outer 11. A reinforcing member 7 for closing the opening 18 is attached to the opening 18, and a rigid portion 74 is provided in the reinforcing member 7.

Specifically, the side member 1 is formed in a rectangular cylindrical shape by combining the side member outer 11 and the side member inner 12.

The side member outer 11 is formed in a U-shape in the opposite direction, and is provided with an upper flange portion 16 extending upward from an end edge of the top wall portion 15, and is provided with a lower flange portion 17 extending downward from an end edge of the bottom wall portion 14.

The side member inner 12 is formed as a flat plate along the vehicle vertical direction, and the upper flange portion 16 and the lower flange portion 17 of the side member outer 11 are connected to each other.

The opening 18 is provided so as to straddle the bottom wall portion 14 from the outer hanging wall portion 13 of the side member outer 11 in a region in which the inner end 41 of the upper arm 4 is pivotally supported in the side member outer 11 described above.

A bifurcated inner end 41 of the upper arm 4 is pivotally supported on the reinforcing member 7 so as to be tiltable. Although not shown in detail, both ends of the support shaft inserted into the center hole of the inner end 41 of the upper arm 4 is attached to the hanging wall portion 71 of the reinforcing member 7 by the holding plate 9 and the bolt 10.

The reinforcing member 7 is a plate having an L-shape in a side view, such as to close the opening 18 from the outer portion to the bottom portion, and a thick portion 73 is provided between the hanging wall portion 71 and the bottom wall portion 72. An inner end 41 of the upper arm 4 is rotatably supported on a hanging wall portion 71 that closes an outer portion of the opening 18 in the reinforcing member 7.

The rigid portion 74 is for increasing the rigidity of the reinforcing member 7, and is formed as a ridge portion having a shape that protrudes sharply outward toward the thick portion 73 of the reinforcing member 7 and is long in the vehicle front-rear direction. By providing the rigid portion 74 having such a shape, it becomes clear that the rigidity of the side member 1 in the vehicle front-rear direction is improved.

The hanging wall portion 71 of the reinforcing member 7 is superposed on the outer hanging wall portion 13 of the side member outer 11 in the vehicle left-right direction, and the superposed portion (refer to the upper side x mark in FIG. 1) is fastened.

Further, the bottom wall portion 72 that closes the bottom portion of the opening 18 in the reinforcing member 7 is superposed on the bottom wall portion 14 of the side member outer 11 in the vehicle vertical direction, and the superposed portion (see the black circle on the lower side in FIG. 1) is fastened.

The fastening is performed by a fastening member such as welding or riveting, for example.

According to the embodiment to which the present disclosure is applied as described above, it is possible to increase the rigidity of the region supporting the inner end of the upper arm 4 in the side member 1. Thus, for example, it is possible to reduce or prevent the deformation of the side member 1 in the vehicle front-rear direction at the time of the load input in the vehicle front-rear direction with respect to the side member 1 at the time of the front collision, in addition, it is possible to reduce the cross-sectional height dimension along the vertical direction of the side member 1 as much as possible.

Further, in this embodiment, in order to minimize the cross-sectional height dimension along the vertical direction of the side member 1 as described above, the height position of the bottom wall portion 14 of the side member outer 11 is not lowered by fastening the hanging wall portion 71 of the reinforcing member 7 to the outer hanging wall portion 13 of the side member outer 11 so as to overlap in the vehicle lateral direction, so that the height position of the top wall portion 15 of the side member outer 11 is lowered as much as possible.

When the cross-sectional height dimension of the side member outer 11 along the vertical direction is made as small as possible in this way, it is possible to cope with a design in which the height position of the hood of the vehicle (not shown) is lowered as low as possible, for example. Moreover, it is possible to prevent the drive shaft 8 from interfering with the bottom wall portion 14 and the lower flange portion 17 of the side member outer 11 when the drive shaft 8 moves up and down as shown by the virtual line in FIG. 2 is raised.

The present disclosure is not limited to the above embodiment, and can be modified as appropriate in the scope of claims and a range equivalent to the scope of claims.

For example, although not shown, it is possible to fasten the overlapping portion by superimposing the hanging wall portion 71 of the reinforcing member 7 on the top wall portion 15 of the side member outer 11 in the vehicle vertical direction. Such cases are also included as embodiments of the present disclosure.

For example, although not illustrated, the side member 1 may be configured such that the side member outer 11 and the side member inner 12 are integrally formed. Such cases are also included as embodiments of the present disclosure.

The present disclosure can be suitably used for an attachment structure for an upper arm of a double wishbone shock absorber.

What is claimed is:

1. An attachment structure for an upper arm of a double wishbone shock absorber including the upper arm and a lower arm, the upper arm including an inner end that is tiltably supported in a cantilever manner on a side member, the side member having a rectangular tube shape and being disposed along a vehicle front-rear direction on each side of a vehicle in a vehicle right-left direction, the lower arm supporting a lower end of a suspension and including an inner end that is tiltably supported in a cantilever manner on a suspension member disposed below the side member, wherein:

the side member has an opening extending from an outer vertical wall to a bottom wall of the side member in a region in which the inner end of the upper arm is supported;

a reinforcing member that closes the opening is attached to the opening;

the reinforcing member includes a rigid portion that increases rigidity;

the reinforcing member is an L-shaped plate in side view to close an area from an outer part to a bottom part of the opening;

on a vertical wall of the reinforcing member that closes the outer part of the opening, the inner end of the upper arm is tiltably supported and the rigid portion is provided; and a bottom wall of the reinforcing member that closes the bottom part of the opening is laid in alignment with the bottom wall of the side member in a vehicle up-down direction, and a portion laid in alignment is fastened.

2. The attachment structure according to claim 1, wherein the rigid portion is a ridge portion protruding outward on a lower end side of the vertical wall of the reinforcing member and having a shape elongated in the vehicle front-rear direction.

3. The attachment structure according to claim 1, wherein the vertical wall of the reinforcing member is laid in alignment with the outer vertical wall of the side member in the vehicle right-left direction, and a portion laid in alignment is fastened.

4. The attachment structure according to claim 1, wherein:

the side member has the rectangular tube shape defined by a combination of an outer side member and an inner side member; and the outer side member has the opening.

* * * * *